Feb. 17, 1942.  S. J. ZAND  2,273,309

AUTOMATIC CAGING DEVICE FOR GYROSCOPES

Filed Nov. 26, 1938  2 Sheets-Sheet 1

INVENTOR
STEPHEN J. ZAND
BY
Herbert H. Thompson
HIS ATTORNEY

Feb. 17, 1942.　　　　S. J. ZAND　　　　2,273,309
AUTOMATIC CAGING DEVICE FOR GYROSCOPES
Filed Nov. 26, 1938　　　2 Sheets-Sheet 2
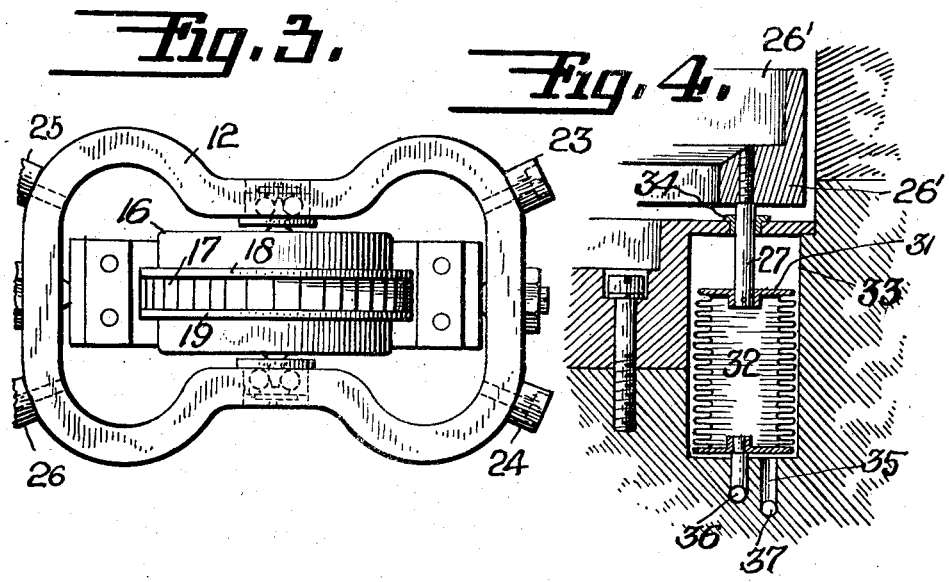
INVENTOR
STEPHEN J. ZAND
BY
Herbert H. Thompson
HIS ATTORNEY Patented Feb. 17, 1942

2,273,309

UNITED STATES PATENT OFFICE 2,273,309

AUTOMATIC CAGING DEVICE FOR GYROSCOPES

Stephen J. Zand, Forest Hills, N. Y., assignor to Sperry Gyroscope Company, Inc., Brooklyn, N. Y., a corporation of New York Application November 26, 1938, Serial No. 242,542

9 Claims. (Cl. 74—5)

This invention relates to position maintaining or directional gyroscopes and more particularly to such gyroscopic instruments used on moving craft such as airplanes and the like. Since the directional gyroscope has no directive force, it is usual to provide a resetting device therefor, so that the readings of the same may be corrected from time to time.

The purpose of this invention is to provide novel and efficient means to cage or lock the gyroscopic element about its horizontal axis so that no precession of the gyro wheel can occur while the element is manually orientated or reset by the operator.

Another purpose of the invention is to provide means by which the gyroscopic element is automatically caged if the air supply to the gyroscope is interrupted, be it manually, by closing a valve in the supply line, or be it accidentally, by failure of the air supply. A further purpose of the invention is to couple the setting knob by which the gyroscope is orientated with the caging device for the gyroscopic element so that it is impossible to orientate the instrument without first caging the gyro.

In the accompanying drawings,

Fig. 3 is a plan view of the rotor and rotor bearing ring.

Fig. 4 is a vertical section through part of the caging means.

Figure 1:
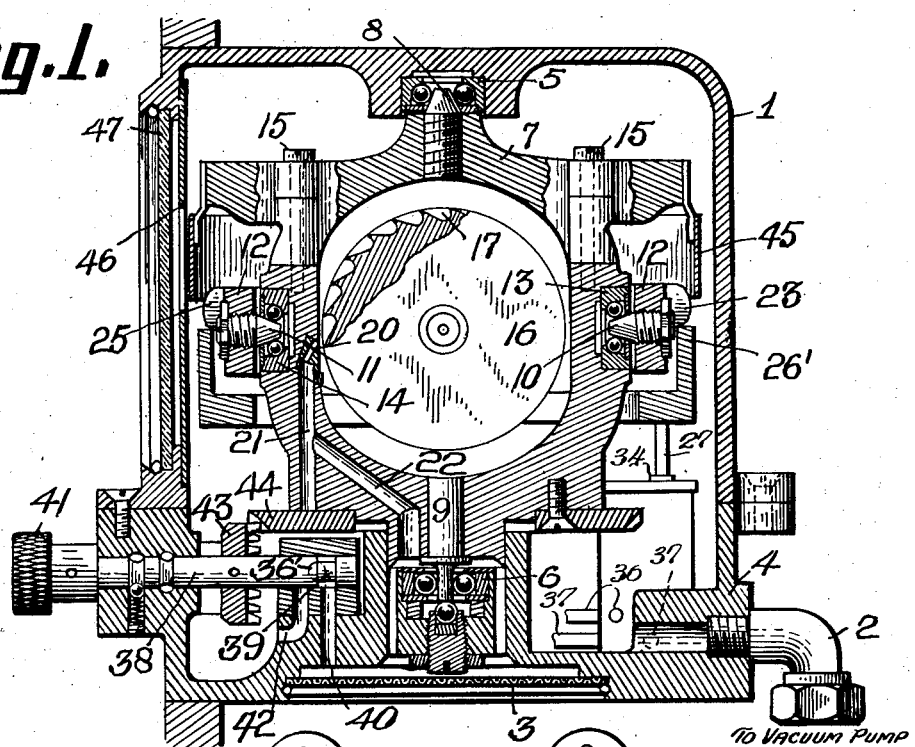
Fig. 1 shows a vertical section through the directional gyroscope.
Figure 2:
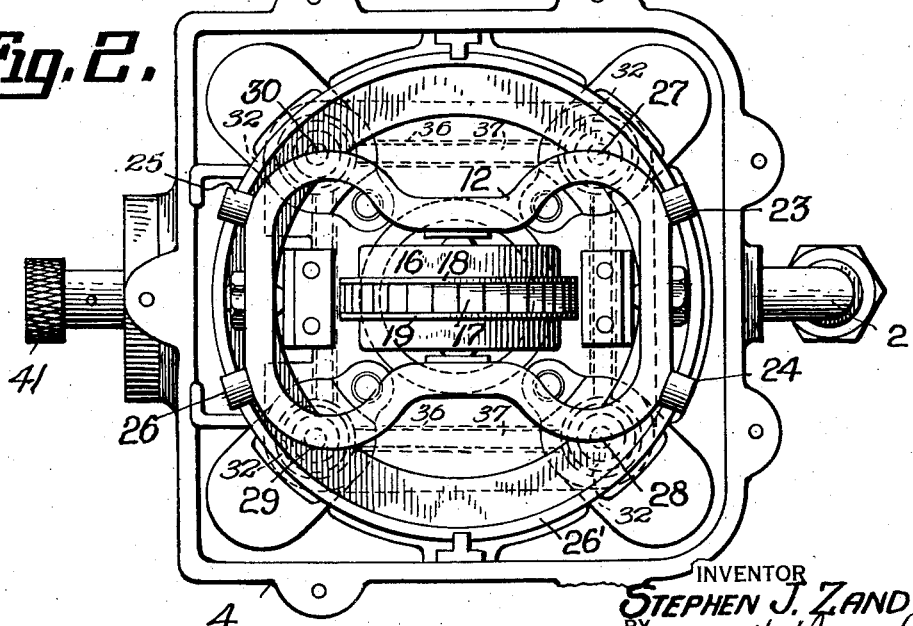
Fig. 2 shows a plan view of the instrument with the casing and certain other parts removed.

The directional gyroscope is shown in Fig. 1 as contained in a casing 1, which may be evacuated by means of an air pump or similar device through pipe 2. The air enters into the casing 1 through a filter 3. The casing is connected to a base 4 and contains in its upper part the ball bearing 5. The base 4 contains a combined radial and thrust bearing 6, so that the vertical frame 7 can freely rotate on its pivots 8 and 9. By means of two horizontal pivots 10 and 11, a rotor bearing frame 12 is mounted for oscillation around the horizontal axis in ball bearings 13 and 14, which are held in the vertical frame 7. The vertical frame consists of two parts held together by screws 15 in order to facilitate assembly of the rotor inside of the frame. The rotor 16 is shown as of the usual air spun type and is formed in known manner as a wheel with pockets 17 between two flanges 18 and 19. The rotor 16 is driven by means of an air jet or jets issuing from nozzle or nozzles 20, to which air is supplied through passages 21 and 22 connected to the outside atmosphere through the filter 3. The rotor bearing frame 12, which is shown more in detail in Fig. 3, carries at four points of its outer periphery rollers 23, 24, 25, and 26, each of which can rotate around the shaft of its holding screw. Directly under these rollers is located the caging ring 26', which is carried on four studs 27, 28, 29, and 30, shown in Fig. 2 and in Fig. 4. These studs have their free ends fastened to the end plates 31 of four metallic bellows or Sylphons each located within a separate air tight enclosure. One of these structures is illustrated in Fig. 4. A stuffing box 34 serves the purpose of preventing leakage of air from the enclosure 33 into the interior of the casing 1. The pocket 33 is connected by means of a passage 35 to an air duct 37, while the interior of the bellows 32 is connected to an air duct 36. The air duct 37 interconnects all four pockets 33 and is permanently connected to the outside air through a passage not shown. The duct 36, on the other hand, after interconnecting the four Sylphons, terminates in ports 36' at a valve stem 38 shown in Fig. 1. This valve stem has a cylindrical recess 39 through which, in the position shown, the channel 36 is connected to an air passage 40 which is connected with the atmospheric air. If the stem 38 by means of the knob 41 is pulled to the left, the air duct 36 is connected to the interior of casing 1 by means of a passage 42. In this case, the bellows are evacuated and the pressure of the atmospheric air in the pockets 33 will compress the bellows into the position shown in Fig. 4, holding the ring 26' in its lowest position. If now the air supply should fail, the vacuum in bellows 32 and in casing 1 would disappear, thereby allowing the bellows 32 to expand under the influence of its own resiliency, lifting the ring 26' until this ring makes contact with the four rollers, 23, 24, 25, and 26, so that the rotor bearing frame 12 is firmly locked. If during normal operation the knob 41 is pushed to the right, the same effect is produced because the interior of the bellows becomes connected to the outside atmosphere so that due to the absence of any pressure differential between the pockets 33 and the bellows 32, the Sylphon will expand, caging the gyro.

While pressing the knob 41 to the right, a crown gear 43 becomes engaged with gear 44 fastened to the vertical frame 7 so that by turning the knob 41, the whole vertical frame 7 can be rotated at will to obtain proper adjustment of the scale 45 with respect to a pointer which may be located on a mask 46 behind a transparent window 47.

It is evident from the above description that the meshing of the two gears 43 and 44 simultaneously causes the caging of the gyroscope, so that precession of the gyro wheel 16 due to turning around the vertical axis is prevented. The automatic caging of the gyro wheel in case of failure of the air pump, or in case of intended interruption of the air supply prevents the gyro wheel from tilting after it comes to rest, so that it is always in properly aligned position whenever the instrument is started up again. As soon as the air pressure is re-established or as soon as the air pump is active again, the caging ring will automatically be retracted, freeing the gyro wheel as its starts to rotate.

If the instrument were to be driven by direct positive pressure instead of by evacuation, the caging device would operate equally well, and all that would be necessary would be to interchange the passages 36 and 37.

It also is possible to apply the device to any other air driven gyroscopic instrument, as for instance, a vertical gyro, as any one skilled in the art will readily understand.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. An automatic caging device for gyroscopes comprising a plurality of metallic bellows and a caging ring supported thereby, a gyroscopic element supported for oscillation around two mutually perpendicular axes and including a rotor, means for operating said rotor by means of a differential pressure, and means for applying said differential pressure to said bellows to maintain said bellows in a compressed state, whereby upon failure of said pressure said bellows expand to advance said ring to cage said gyroscopic element against oscillation around one of its axes.

2. In a position maintaining air spun gyroscope, a support, a gyroscopic element suspended thereon for oscillation about two mutually normal axes, a rotor for the gyroscopic element, a caging means for locking said element to prevent oscillation about at least one of said axes, a resilient expansible container cooperating with said caging means for normally locking said element, means whereby a pressure differential is supplied for spinning the rotor of the gyroscopic element, and means for connecting said container to said pressure differential so as to normally hold said cage in the unlocked position as long as the pressure differential is maintained, but to render said cage operative upon failure thereof to lock the gyroscopic element.

3. In an air driven directional gyroscope having a rotor and a rotor bearing frame mounted for turning about a vertical axis and oscillation about a horizontal axis, a longitudinally movable and rotatable setting knob having two positions, normally disengaged gearing between said knob and gyroscope for setting the gyroscope about its vertical axis when the knob is placed into one of said positions, means for supplying differential operating pressure to said rotor, a cage for locking the frame about its horizontal axis only, resilient means for holding said cage locked subject to the differential air pressure for holding it unlocked during operation of the gyroscope, and an air valve connected to said knob adapted, when said knob is in said one position, to relieve the differential pressure affecting said resilient means to thereby cause the frame to be caged at the time said gyroscope is being set.

4. In an air driven directional gyroscope, an outer casing, a vertical ring pivotally mounted therein for orientation about a vertical axis, a rotor bearing frame pivotally mounted within said ring for oscillation about a horizontal axis, means for maintaining a pressure within said casing different from that of the atmosphere, an automatic caging means for said frame including a spring expanded container normally collapsed by the pressure differential to keep said caging means inoperative, a gear on said vertical ring, a movably mounted, normally disengaged cooperating gear for turning said ring about its vertical axis, and a valve connected to the latter gear adapted to be moved when said gears are moved into engagement, said valve operating to equalize the pressure in said container and casing, to effect the locking of the rotor bearing frame about its horizontal axis by said automatic caging means and by the engagement of said gears permit the resetting of the vertical ring of the gyroscope to any position about its vertical axis.

5. A gyroscopic direction indicator as claimed in claim 4, wherein said automatic caging means is also brought into operation by failure of the operating air pressure.

6. In a caging device for a gyroscope having three degrees of freedom and having an air spun rotor and a rotor bearing frame, means for supplying air to the gyroscope at a pressure different from that of the atmosphere for spinning the rotor, a movable lock for engaging the rotor bearing frame to prevent oscillation of the same, and means for automatically bringing said lock into engagement with the rotor bearing frame to lock the same upon failure of the supplied air pressure including a biased expansible container, subject on one side to atmospheric pressure and on the other to the supplied air pressure, so that said lock engages the rotor bearing frame at all times except when the gyroscope and container are affected by the differential pressure.

7. In a position indicating instrument, a casing, a gyroscopic element suspended therein for oscillation around a vertical and a horizontal axis, a rotor for the gyroscopic element, resiliently biased caging means normally locking said element to prevent oscillation about one of its axes, means for supplying a pressure differential between the atmosphere and the inside of the casing for spinning the rotor of the gyroscopic element, and means responsive to the pressure differential for rendering said caging means inoperative.

8. In a position maintaining gyroscope, a support, a gyroscopic element suspended thereon for oscillation around two mutually perpendicular axes, a rotor for the gyroscopic element, a caging ring adapted to normally lock said element to prevent oscillation thereof around one of its axes, a plurality of resilient metallic bellows supporting said ring, means for supplying a pressure differential for spinning the rotor of the gyroscopic element, and means for utilizing the pressure differential between the inside and outside of said bellows for changing the length of the bellows so that the caging ring is retracted to unlock said gyroscopic element.

9. In a position maintaining gyroscope, a normally evacuated casing, a gyroscopic element suspended therein for oscillation around two mutually perpendicular axes, a caging ring adapted to lock said element to prevent oscillation thereof around one of its axes, a plurality of resilient metallic bellows supporting said ring, means for mounting said bellows in separate containers connected to the atmosphere, and means for connecting the inside of said bellows to the inside of said casing, the normal differential pressure between the atmosphere and the inside of the casing being effective to change the length of the bellows to unlock the gyroscopic element.

STEPHEN J. ZAND.